United States Patent [19]
Bass et al.

[11] Patent Number: 6,142,707
[45] Date of Patent: Nov. 7, 2000

[54] DIRECT ELECTRIC PIPELINE HEATING

[75] Inventors: Ronald Marshall Bass, Houston; Carl Gottlieb Langner, Spring, both of Tex.

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/921,737

[22] Filed: Aug. 27, 1997

Related U.S. Application Data

[63] Continuation of application No. 08/625,432, Mar. 26, 1996, abandoned.

[51] Int. Cl.$^7$ .................................................. F16L 1/04
[52] U.S. Cl. ........................... 405/158; 137/341; 138/33; 166/248; 166/245; 392/304; 392/321; 405/157; 405/169; 405/170
[58] Field of Search .................................... 405/158, 154, 405/157, 169–173; 166/248, 265, 302; 392/304, 320, 321, 469; 285/41; 138/32, 33; 137/334, 341

[56] References Cited

U.S. PATENT DOCUMENTS

| 972,308 | 10/1910 | Williamson .......................... 392/304 X |
|---|---|---|
| 1,231,202 | 6/1917 | Saylor . |

(List continued on next page.)

FOREIGN PATENT DOCUMENTS

| 109122 | 4/1937 | Australia . |
|---|---|---|
| 103122 | 2/1938 | Australia ................................ 392/320 |
| 1359445 | 7/1974 | European Pat. Off. . |
| 1437587 | 5/1976 | European Pat. Off. . |
| 1532730 | 11/1978 | European Pat. Off. . |
| 569815 | 8/1977 | U.S.S.R. ................................. 392/321 |
| 569815 | 9/1977 | U.S.S.R. . |
| 2084284 | 4/1982 | United Kingdom . |

OTHER PUBLICATIONS

Purported Invention Disclosure by Bernard J. Eastlund and John Haeber, Production Technologies Company, L.L.C. (PTC) dated April 28, 1995, "Apparatus for Introducing Electric Current into an Offshore Pipeline,"4 pp. (See discussion in the Supplemental Information Disclosure Statement. Note also filed pursant to MPEP 724.02.).

Production Technologies Company Invention Disclosure of R. M. Bass dated Jul. 24, 1986, "Disclosure for Controlling Paraffin Deposition in Subsea Flowiness."(See discussion in the Supplemental Information Disclosure Statement. Note also filed pursuant to MPEP 724.02.).

"Taking Induction Heating Underwater,"Process Heating, Jul./Aug. 1995, 1 p.

Fred S. Epstein and Gary L. White, "Understanding Impedance Heating,"Chemical Engineering, May 1996, pp. 112–118.

(List continued on next page.)

*Primary Examiner*—Dennis L. Taylor
*Attorney, Agent, or Firm*—Mark A. Smith

[57] ABSTRACT

A system for direct electric heating of a subsea pipeline is disclosed in the form of a pipe-in-pipe flowline having an electrically conductive outer carrier pipe and an electrically conductive inner pipe or flowline arranged longitudinally, substantially concentrically within the outer pipe. An annulus is defined between the inner and outer pipes and a pipe insulating joint assembly structurally joins, but electrically insulates, the inner and outer pipes at a first end of the subsea pipeline. A power input provided on the surface facilities is electrically connected across the inner and outer pipes at the first end of the pipeline, and an electrical pathway completes the circuit by connecting the inner and outer pipes at the second end of the pipeline.

19 Claims, 4 Drawing Sheets

U.S. PATENT DOCUMENTS

| | | | |
|---|---|---|---|
| 2,096,279 | 10/1937 | Karcher | 255/28 |
| 2,217,857 | 10/1940 | Byck | 166/21 |
| 2,660,249 | 11/1953 | Jakosky | 166/17 |
| 2,678,377 | 5/1954 | Justiz | 392/321 |
| 2,714,930 | 8/1955 | Carpenter | 166/60 |
| 2,757,738 | 8/1956 | Ritchey | 166/39 |
| 2,982,354 | 5/1961 | Green | 166/60 |
| 3,184,958 | 5/1965 | Eaton | 73/40.5 |
| 3,423,570 | 1/1969 | Trabilcy | 138/33 X |
| 3,432,186 | 3/1969 | Braun | 285/53 |
| 3,507,330 | 4/1970 | Gill | 166/248 |
| 3,547,193 | 12/1970 | Gill | 166/248 |
| 3,556,218 | 1/1971 | Talley | 166/265 |
| 3,605,888 | 9/1971 | Crowson et al. | 166/248 |
| 3,614,986 | 10/1971 | Gill | 166/303 |
| 3,620,300 | 11/1971 | Crowson | 166/248 |
| 3,630,038 | 12/1971 | Ando | 405/154 |
| 3,642,066 | 2/1972 | Gill | 166/248 |
| 3,706,872 | 12/1972 | Trabilcy | 219/300 |
| 3,789,188 | 1/1974 | Rudbarg | 137/341 X |
| 3,859,503 | 1/1975 | Palone | 219/278 |
| 3,933,031 | 1/1976 | Uhlarik | 73/40.5 R |
| 3,944,262 | 3/1976 | Stiner et al. | 285/53 |
| 3,958,636 | 5/1976 | Perkins | 166/248 |
| 3,975,617 | 8/1976 | Othmer | 219/300 |
| 4,010,799 | 3/1977 | Kern et al. | 166/248 |
| 4,011,652 | 3/1977 | Black | 29/455 R |
| 4,017,102 | 4/1977 | Henderson | 285/41 |
| 4,140,179 | 2/1979 | Kasevich et al. | 166/248 |
| 4,319,632 | 3/1982 | Marr, Jr. | 166/60 |
| 4,401,162 | 8/1983 | Osborne | 166/248 |
| 4,450,711 | 5/1984 | Claude | 73/40.5 R |
| 4,496,174 | 1/1985 | McDonald et al. | 285/53 |
| 4,553,023 | 11/1985 | Jameson et al. | 137/341 X |
| 4,644,780 | 2/1987 | Jeter | 73/40.5 R |
| 4,667,505 | 5/1987 | Sharp | 73/40.5 R |
| 4,684,786 | 8/1987 | Mann et al. | 137/341 X |
| 4,716,960 | 1/1988 | Eastlund et al. | 166/60 |
| 4,839,644 | 6/1989 | Safinya et al. | 340/854 |
| 4,861,074 | 8/1989 | Eastlund et al. | 285/53 |
| 4,874,925 | 10/1989 | Dickenson | 137/341 X |
| 4,992,001 | 2/1991 | Harrison | 405/166 |
| 4,996,879 | 3/1991 | Kruka et al. | 73/592 |
| 5,072,622 | 12/1991 | Roach et al. | 73/40.5 R |
| 5,289,561 | 2/1994 | Costa Fiho | 137/341 X |
| 5,421,675 | 6/1995 | Brown et al. | 405/170 |
| 5,464,307 | 11/1995 | Wilkins | 405/166 |
| 5,490,562 | 2/1996 | Arnold | 166/302 X |

OTHER PUBLICATIONS

"Tubing Casing Wireless Telemetry (Tucas System),"Schlumberger web page (1993?/ Jun. 1996), 16 pp. (See text of Supplemental Information Disclosure Statement re supposed date of technology described.).

Brochure –World Wide Experience List –Compressed Gas Insulated Transmission Bus System Type CGIT, ABB Power T & D Company Inc., 30 Oak Street,Westborough, MA 01581, USA, 6 pp. (Describes work from 1972, dated Oct. 1996. See text of Supplemental Information Disclosure Statement re supposed date of technology described.).

Compressed Gas Insulated Transmission Bus Ducts, ABB Power T&D Company, CGIT/IPB Divison, Westborough, MA USA, 22 pp. (Undated. Describes work from 1972. See text of Supplemental Information Disclosure Statement re supposed date of technology described.).

Brochure –New Double Pipe Insulated System (DPIS) Designed by Snamprogetti, Snamprogetti Offshore Divison, 6 pp. (See text of Supplemental Information Disclosure Statement re supposed date of technology described.).

Brochure –Combi Pipe –the end of clogged pipelines, Alcatel Contracting Norway and Aker Engineering, 7 pp. (Undated. See text of Supplemental Information Disclosure Statement re supposed date of technology described.).

"Introduction to Direct Heating ofSubsea Pipelines,"overview byStatoil, Saga Petroleum, CSO Norge, Alcatel, Kabel Norge and EFI, Feb. 1988. (Undated. See text of Supplemental Information Disclosure Statement re supposed date of technology described.).

Anecdote –Fuel Oil Between Buildings ( See text of Supplemental Information Disclosure Statement.).

Anecdote –Asphalt Transfer Liner from Tank Cars et al. ( See text of Supplemental Information Disclosure Statement.).

Anecdote Thermo Systems under river crossings. ( See text of Supplemental Information Disclosure Statement.).

Krevelen, D. W., Univ. of Technology. Delft. The Netherlands, "Properties of Polymers", $3^{rd}$ Edition (Revised), Elsevier; Amsterdam–Oxford–New York–Tokyo, 1990; pp. 641–653.

Gaylord, N.G., Gaylord Associates, Newark, New Jersey, "Polymers –Part I. Polyalklene Oxides and Other Polyethers"; Interscience Publishers: New York–London–Syndey, pp. 9–80.

Monobloc Insulating Joints Type "IK".

N. B. Carson, "A New Method for Heat Tracing Long Pipelines," *ASME*, 74–Pet–35, paper presented at th Petroleum Mechanical Engineering Conference, Dallas, Texas, Sep. 15–18, 1974, pp. 2–4.

F. R. Newbold and T. K. Perkins, "Wellbore Transmission of Electrical Power,", *The Journal of Canadi Petroleum Technology*, Jul.–Sep. 1978, Montreal, pp. 3–52.

K. H. Afkhampour, "A Novel Approach to Solving Downhole Fluid Flow Problems by Use of an Electric Heat–ing System," Paper No. PCIC–85–35, 12 pp.

R. Wash, "Electromagnetic Energy Helps Recovery," *Gulf Coast Oil World,,* Jun. 1986, pp. 18–19.

F. G. Bosch, K. J. Schmitt, and B. J. Eastlund, "Evaluation of Downhole Electric Impedance Heating systems for Paraffin Control," Paper No. PCIC–90–34 presented at Industry Applications Society 37th Annual Petroleum and Chemical Industry Conference, Houston, Texas, Sep. 10–12, pp. 223–227.

H. Collins and M.A.R. Lyle, "Progress Reported in Design of Reelable Insulated Subsea Flow Lines," *Oil and Gas Journal*, Sep. 24, 1990, pp. 102–106.

M. I. Mollison, "Foam Insulation Gets First Reeled Installation off Australia," *Oil and Gas Journal*, May 18, 1992, pp. 80–82.

"Dunbar in Depth," *Offshore Engineer*, Dec. 1994, 2 pp.

A. Anselmi et al., "TTDPIS: A New Underwater Technology in the Field of Traced Insulated Pipelines," 1994 OMAE, vol. 5, Pipeline Technology, *ASME*, 1994, pp. 69–76.

B. J. Eastlund et al., "New System Stops Paraffin Buildup," *Petroleum Engineer*, Jan. 1989, 3 pp.

C. G. Langer, "Engineering Report—1979 Construction of the Cognac 12–inch Pipeline From Mississippi Canyon Block 194 to Southwest Pass East Bay Central Facilities, Offshore Louisiana,"ES No. 74–82, Job No. 560513, Shell Oil Company, Pipeline Construction Department, *, 6 pp.

The Electrothermic Co. (TEC), 4916 Bear Lane, P.O. Box 4227, Corpus Christi, TX 78408 advertisement/sales brochure, 4 pp.

"New Double Pipe Insulated System (DPIS) Designed by Snamprogetti", Snamprogetti Offshore Division, Viale de Gasperi 16, San Donato Milanese, Milan, Italy, advertisement, 6 pp.

Protest Document, Dec. 8, 1987 letter of Andrew W. Marr, Jr. to the Assistant Commissioner of Patents requesting issuance of U.S. Patent 4,716,960, available in that file history as of Jan. 5, 1988. (with attachments, total of 12 pages).

Stop Paraffin Build–up and Realize Your Well's Full Potential . . . Plug in Paratrol. International, Inc. (PTI), 15423 Vantage Parkway East, Houston, Texas 77032, advertisement, Copyright 1989, 6 pp.

"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 4 pp.

"General Product Specification—Pipeline Insulating Joint," HydroTech Systems, Engineered Pipeline Products, advertisement, pp.

"Monolithic Pipeline Electrical Isolation Joints," Hydro-Tech Systems, Inc., Engineered Pipeline Products, advertisement, Nov. 1996, 6 pp.

"Cable–Free Electrical Systems for the Oil to Gas Industry," Production Technologies Company, L.L.C., 600 Kenrick, Suite C–30; Houston, Texas 77060, advertisement, Copyright 1996, 6 pp.

Brochure –WHY USE SKIN EFFECT PIPE HEATING? Thermo Systems Technology, Inc. Four Commerce Park Square, 23200 Chagrin Boulevard, Suite 600,Beachwood, Ohio 44122, Copyright 1991, 2 pp.

F. G. Bosch et al, "Evaluation of Dowhole Electric Impedance Heating Systems for Paraffin Control in Oil Wells." Paper No. PCIC–90–34, 1990, presented at Industry Applications Society $37^{th}$ Annual Petroleum and Chemical Industry Conference, Houston, Texas Sept. 10–12, 1990, pp. 223 227.

F. Aarseth and E. Bentsen, "Heating of Pipelines, and Power Supply to Subsea Electrical Equipment," Aker Engineering a.s. A. Bjømstad and B. Knutsen, Alcatel Contracting Norway a.s., DOT 1995, 23 pp.

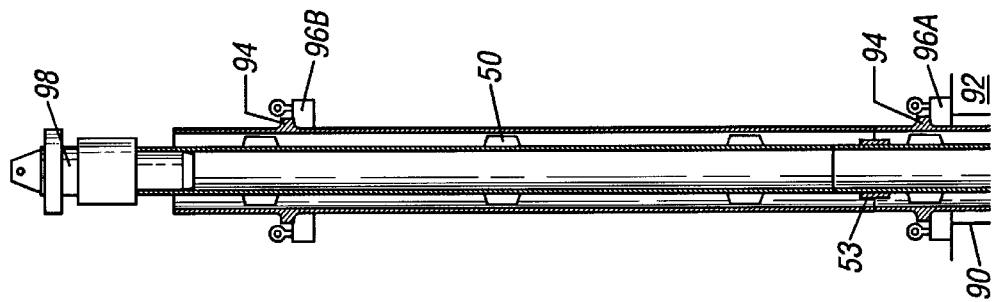
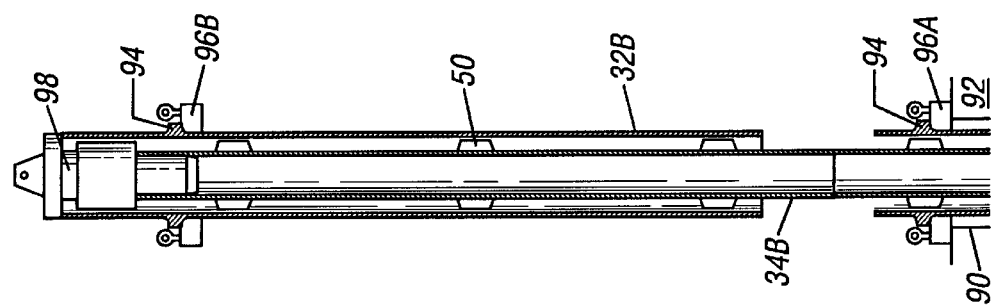
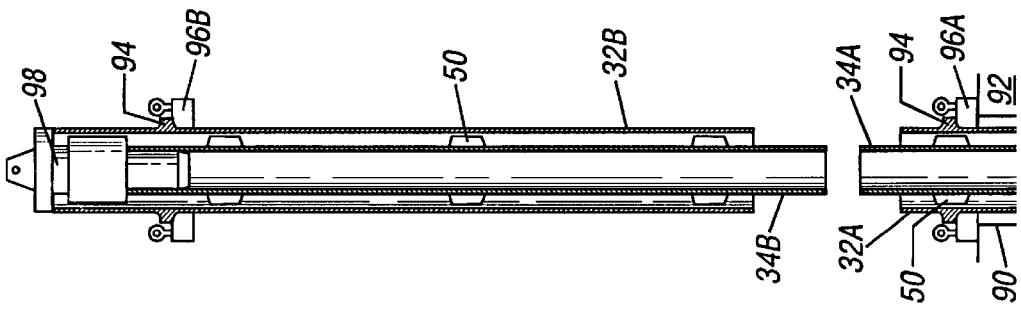

DIRECT ELECTRIC PIPELINE HEATING

This application is a continuation of application Ser. No. 08/625,432, filed Mar. 26, 1996, now abandoned.

BACKGROUND OF THE INVENTION

The present invention relates to a system for heating an offshore pipeline. More particularly, the present invention relates to a system for providing direct electric heating along the length of an extended subsea pipeline. Heating is caused by a combination of electrical resistance and magnetic eddy current effects associated with transmission of an alternating current through the pipeline.

Offshore hydrocarbon recovery operations are increasingly pressing into deeper water and more remote locations. Here it is very expensive to provide surface facilities and it is desirable to minimize these requirements. Often satellite wells are completed subsea and are tied to remote platforms through extended subsea pipelines as a means to reduce the production cost. Even these platforms serving as central hubs in the offshore infrastructure are provided only the minimal facilities required for collecting and partially treating the well fluids before exporting them toward onshore facilities through yet more subsea pipelines. However the subsea pipelines crucial to this infrastructure prove a weak link as they are subject to plugging with hydrates or with paraffin deposition. Both hydrates and paraffins are of limited trouble at the pressures and temperatures experienced at the producing well, but can cause serious plugging problems when cooled to lower temperatures during pipeline transport.

Hydrates are the product of complicated chemistry in which water and certain hydrocarbon components of the produced well fluids combine to form ice-like crystals in pipelines as the temperature decreases during transport. The resulting hydrate crystals can suddenly solidify and plug the bore of the subsea pipeline. Paraffins are also a product of temperature in the pipeline and come out of suspension and deposit on the pipeline walls when the well fluids are below the "cloud point" which may be as high as 100–120 degrees Fahrenheit. Eventually this waxy buildup can completely seal off a pipeline.

These difficulties are combated between satellite subsea wells and platform hubs by insulating the pipelines and moving the produced well fluids as quickly as possible to minimize temperature loss. However, the long length of such pipelines renders passive insulation ineffective and it is often necessary to resort to large amounts of chemical inhibitors or to mechanical clearing operations to maintain the pipeline free of plugs.

In conventional practice, removal of a hydrate plug requires reducing the fluid pressure on both sides of the plug and applying chemical agents to the plug. Paraffin buildup is most often remedied by frequent routine pigging to scrape away the deposits fouling the bore of the pipeline. Before entering the pipelines between the platform and the onshore facilities, the fluids may be dewatered, separated into oil and gas, and treated with additives or other refined products. Again, it is often necessary to supplement this platform processing with routine pigging operations, even in these export pipelines.

Pipelines that are shut-in during workover of the wells or during work on the platform facilities are particularly susceptible to hydrate and paraffin problems as the hydrocarbon temperature drops toward the ambient seawater temperature. Thus, in present practice it is sometimes necessary to displace the hydrocarbons throughout an entire subsea pipeline with fluids that protect the pipeline during such operations. Further, it is then necessary to purge such fluids before production can resume. This is not an insignificant expense in both time and materials when considering pipelines whose lengths are measured in miles and tens of miles.

Thus, there is remains a clear need for an economical means to protect extended subsea pipelines from hydrate formation and paraffin deposition.

SUMMARY OF THE INVENTION

Toward providing these and other advantages, the present invention is a system for direct electric heating of a subsea pipeline in the form of a pipe-in-pipe subsea pipeline having an electrically conductive protective outer pipe and an electrically conductive inner pipe or flowline arranged longitudinally, substantially concentrically within the outer pipe. An annulus is defined between the inner and outer pipes and a pipe insulating joint assembly structurally joins, but electrically insulates, the inner and outer pipes at a first end of the subsea pipeline. A power input is provided on the surface facilities which is electrically connected across the inner and outer pipes at the first end of the pipeline and an electrical pathway electrically connects the inner and outer pipes at the second end of the pipeline.

BRIEF DESCRIPTION OF THE DRAWINGS

The brief description above, as well as further advantages of the present invention will be more fully appreciated by reference to the following detailed description of the preferred embodiments which should be read in conjunction with the accompanying drawings in which:

FIGS. 7A–7D illustrate a progression of side elevational views of a method for installing the pipe-in-pipe direct heating system of the present invention.

DETAILED DESCRIPTION OF THE PREFERRED EMBODIMENTS

Figure 1:
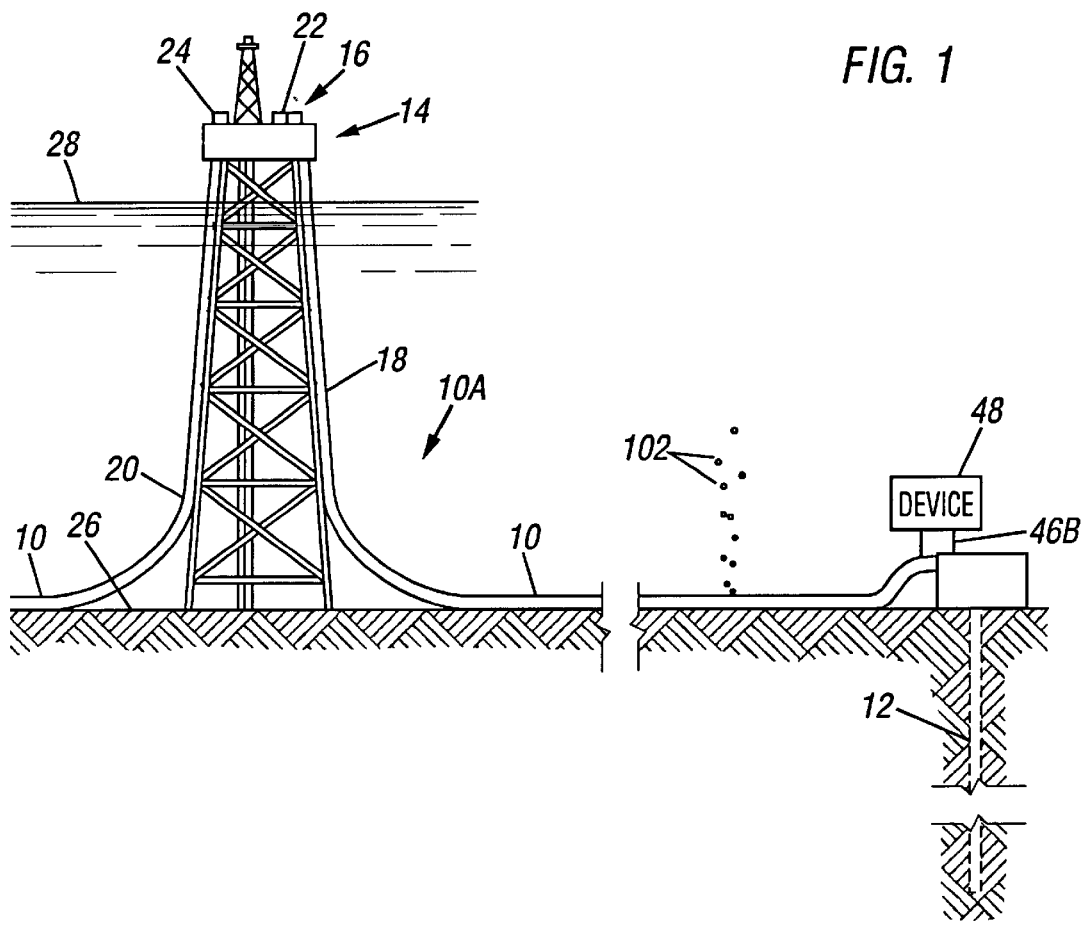
FIG. 1 is a side elevational view of a platform and a satellite subsea well connected by a subsea pipeline.

FIG. 1 illustrates the environment of the present invention. Here a remote satellite well 12 is connected to platform 14 with subsea pipeline 10 which is provided with a system 10A for direct electric heating in accordance with the present invention. Subsea pipeline 10 is brought to surface facilities 16 on platform 14 through import riser 18. In this illustration, surface facilities 16 include initial treatment facilities 22 as well as a power source, electrical generator 24. In similar fashion, an export riser 20 leads to a continuation of the pipeline 10 to shore facilities (not shown). It is important to note that subsea pipeline connecting satellite well 12 to its first treatment facility on the platform may be 20 to 40 or more miles long. Further, the pipeline is extremely inaccessible, resting on the seabed 26 that may be a half mile or more below the surface 28 of the ocean.

Components of the well fluids produced may be easily transported immediately at subsea well 12 where they retain the formation temperatures that often range from 150–180 degrees Fahrenheit. However, once produced, they have a long journey through a pipeline in a relatively cold environment. Even in relatively warm oceans such as the Gulf of Mexico, the ocean temperature at pipeline depth may be as cold as 40 degrees Fahrenheit or so. Unchecked, the heat loss across this temperature gradient over this long journey would easily cause the formation of hydrates and the precipitation of paraffins causing the pipeline flow area to become constricted or even to plug. Also, the fluid viscosities of some of the heavier crude oils are adversely impacted by low temperatures even before hydrates or paraffins become a problem. Further, upon occasion it is necessary to work over the well or to take the platform out of service for a period of time. In such instances, the pipeline is shut-in and flow ceases for a period, allowing the entire pipeline to cool to the seawater temperature.

These are the challenges of the present invention, to provide for direct heating along the length of the pipeline to prevent, or even reverse, hydrate formation and paraffin precipitation inside the pipeline, and to enhance the flow of viscous crudes.

Figure 2:
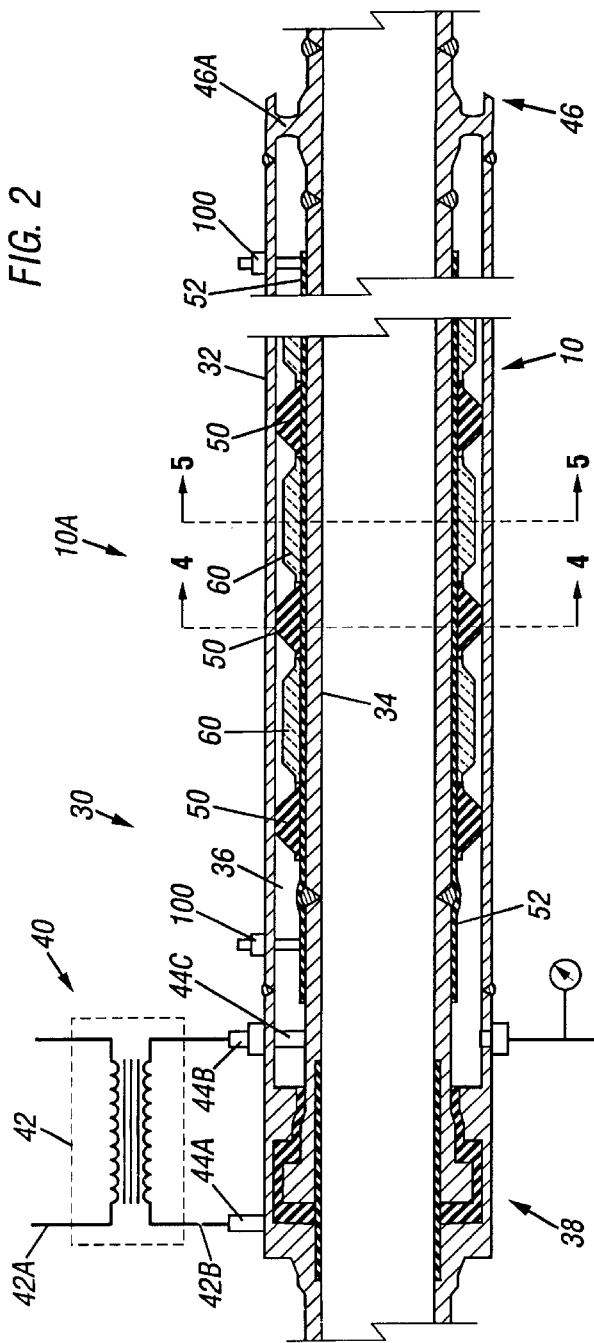
FIG. 2 is a cross sectional view of a system for direct heating of a pipeline in accordance with one embodiment of the present invention.

FIG. 2 is a close up view of the direct electric pipeline heating system 10A. Pipeline 10 is shown to be a pipe-in-pipe flowline 30 having an electrically conductive carrier or outer pipe 32 and an electrically conductive product flowline or inner pipe 34 arranged longitudinally and substantially concentrically within the outer pipe. An annulus 36 is defined between the inner and outer pipes.

The first end or platform end of pipe-in-pipe flowline 30 is provided with a pipe insulating joint assembly 38 which structurally joins, but electrically insulates the inner and outer pipes. The first end of the pipeline is terminated at the surface facilities 16 of platform 14 (see FIG. 1). Returning to FIG. 2, an electrical power input 40 is connected across inner pipe 34 and outer pipe 32. Here a first terminal 44A is provided for power input to the outer pipe 32 and a second terminal 44B is provided by an electrical penetrator 44C for power input to the inner pipe 34. The power input could be a DC source, but is here illustrated as an AC source interfacing through a transformer 42 having a primary coil 42A connected to the generator and a secondary coil 42B connected across the first and second terminals.

Thus pipe-in-pipe flowline 30 serves as a power transmission line, with the circuit completed by an electrical pathway connecting the inner and outer pipes at the second or remote end of the pipeline. In transmitting this power, the entire length of pipe-in-pipe flowline 30 serves as an electrical heater. Heat is produced by the electrical power loss from the current flow through the pipe-in-pipe flowline. For AC, this heating is due to a combination of interacting effects, including electrical resistance effects, magnetic effects (including magnetic hysteresis and eddy currents) and electromagnetic effects (including the skin effect and proximity effect).

In FIG. 2, the connection 46 for this pathway joining the inner and outer pipes is provided by electrically conductive bulkhead 46A. Alternatively, the pathway could be through an electrical device 48 as illustrated schematically in FIG. 1. This latter embodiment would provide another insulating pipe joint assembly 38 at the second end of the pipeline with a second electrical penetrator and terminals 44A and 44B (see FIG. 2) to serve as a power takeout 46B at the subsea wellhead end of pipeline 10. Remote devices at the wellhead can thus be conveniently supplied with electrical power to perform such operations as boosting the well fluids pressure with a pump at the wellhead or preheating the produced fluids as they enter the pipeline. Further, power provided at the wellhead can be transported downhole, e.g., to drive a submersible pump in the wellbore or to heat the downhole tubing string.

It is necessary that inner pipe 34 be electrically isolated from outer pipe 32 along the entire length of pipe-in-pipe flowline 30. Direct contact is prevented with a plurality of electrically insulative centralizers 50 spaced at frequent intervals along annulus 36. However, it is also necessary to take steps to prevent arcing and other electrical discharges across the annulus. These steps may include careful quality control measures to prevent water and debris from entering the annulus, removing any sharp points or edges protruding into the annulus, providing an arc-resistant coating 52 on the outside of inner pipe 34, and providing a liner 54 at the power input and insulating joint assembly 38.

It is also useful to remove water from the annulus. This may be accomplished by forcing dry air or dry nitrogen through the annulus, or alternatively, by evacuating the annulus with a vacuum pump 56 to remove air and water vapor. Once evacuated, the annulus may be maintained under vacuum as part of a thermal insulation program or as part of a leak detection program as discussed later. Alternatively, it may be desired, after evacuating the annulus, to inject an arc-suppressing gas into the annulus such as Sulphur Hexafloride ($SF_6$) which is shown available in a reservoir 58 in FIG. 2.

Even though direct electric heating is supplied along the length of the pipeline, appropriate steps are taken in the illustrated embodiments to limit the heat loss from the pipeline to the environment. The amount of electrical power required to maintain the inner pipe and contents at a given temperature is minimized by minimizing the heat losses in the system. Direct conductive heat transfer is limited by selecting materials for centralizers 50 that are thermally insulative as well as electrically insulative and by properly selecting the centralizer length and the spacing between centralizers. Heat loss through convection can be reduced by maintaining the annulus under a vacuum, as discussed above, or by providing insulation panels 60 between centralizers 50. Radiant heat loss is reduced significantly by placing a low emissivity coating, such as an aluminum-coated mylar film, on inner pipe 34, but may already be a small factor if insulative panels 60 are used. Further, it should be noted that Sulphur Hexafloride ($SF_6$) can provide thermal insulation as well arc-suppression benefits. It may also be useful to hold the vacuum in the annulus for an extended period, e.g., over several weeks, before injecting the Sulphur Hexafloride ($SF_6$) in order to remove air defused into the open cells of the low density plastic foam of insulation panels 60.

Figure 3:
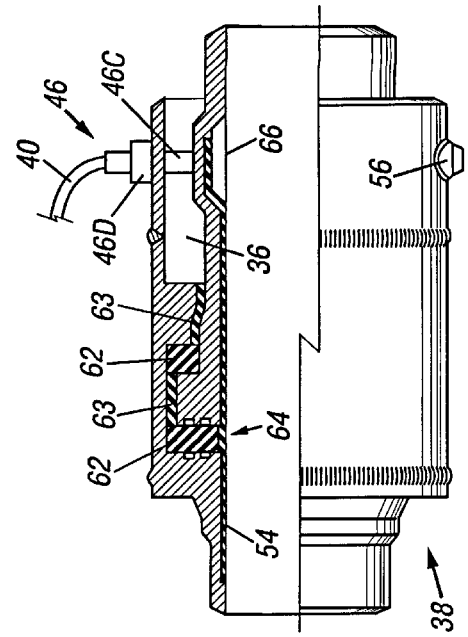
FIG. 3 is a partially cross sectioned side elevational view of the pipe insulating joint assembly of the embodiment of FIG. 2.

FIG. 3 illustrates an insulated joint assembly 38 in greater detail. The inner pipe is isolated from the outer pipe by annular rings 62 formed from a material that is both strong and very resistant to electrical breakdown, e.g., a suitable epoxy or zirconia. Other annular spaces 63 within the insulating joint 38 are filled with similar high strength, electrically resistant materials. Liner 54 is bonded over each side of insulator interface 64 to prevent electrical breakdown due to brine in the well fluids. This figure also illustrates an electrical terminal 46 connected to the inner pipe by an electrical penetrator 46C which passes through an electrically insulated, vacuum-tight port 46D. In this embodiment the liner 54 terminates in a swage ring liner termination 66.

Figure 4:
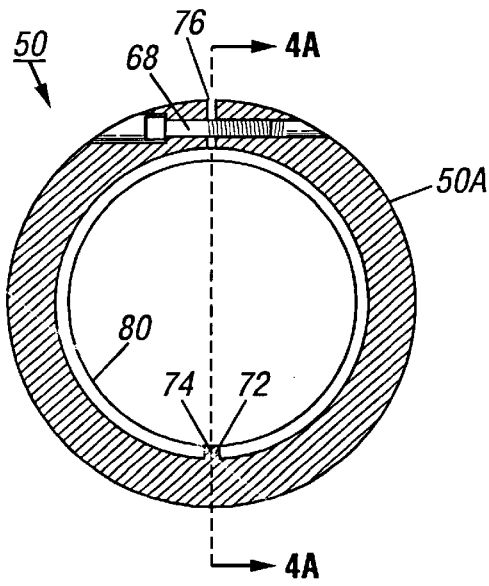
FIG. 4 is an axial cross sectional view of the centralizer of the embodiment of FIG. 2, taken at line 4—4 of FIG. 2.
Figure 4A:
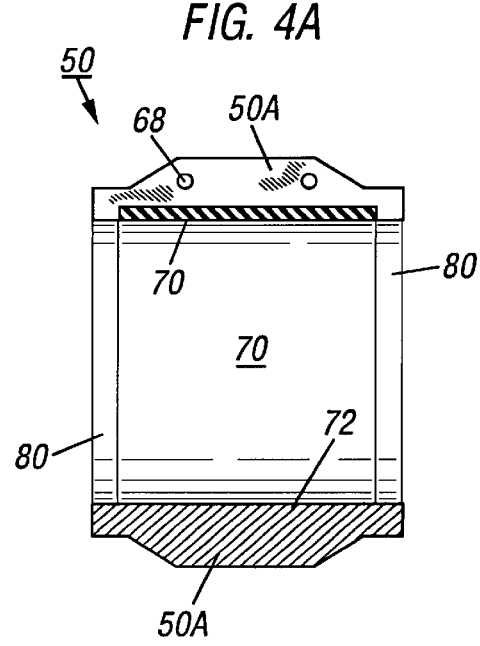
FIG. 4A is a longitudinal cross sectional view of the centralizer of FIG. 2, taken at line 4A—4A of FIG. 4.

FIGS. 4—4A illustrate one embodiment of insulated centralizer 50. Here centralizers are molded and/or machined from a strong, non-charing or char-resistant plastic such as Nylon or a polyacetal plastic such as that marketed under the name Delrin to form collars 50A that are secured about inner pipe 34 with non-conductive elements such as nonmetallic socket head cap screws 68. In this embodiment water and solid intrusion within the centralizer is blocked to prevent electrical discharge. A rubber liner 70 is secured about inner pipe 34 and collars 50A are placed around the rubber liner which is captured within shoulders 80. A key 72 on the collar fits within the gap 74 in the rubber liner. This key is opposite the open side or slit 76 of the collar and prevents any alignment of gap 74 and slit 76. Further, it may be desirable to completely seal the slit with a silicon adhesive caulk or a silicon gasket. Such precautions may be desirable to prevent contaminants from forming a bridge from the inner pipe to the outside of centralizer 50 which is in contact with outer pipe 32. In a another embodiment, the rubber liner 70 overlaps when wrapped around the inner pipe. This liner is taped in place and halves of a "keyless," two-piece collar 50A are then clamped over the rubber liner and tightened down with opposing screws 68.

Figure 8:
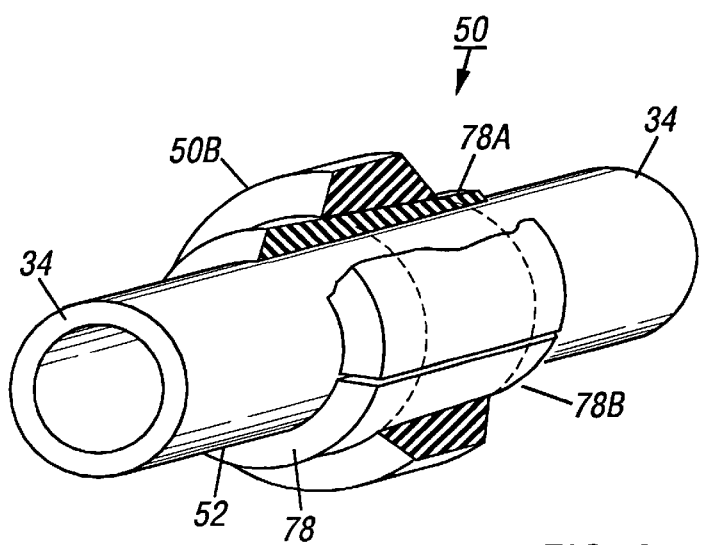
FIG. 8 is a partially sectioned isometric view of an alternate embodiment of a centralizer.

FIG. 8 illustrates another embodiment of the insulated centralizer 50. Here centralizer body 50B and tapered sleeve 78 are molded and/or machined as before from a strong, non-charring plastic such as Nylon or Delrin. Centralizer is assembled by placing the two halves 78A and 78B of the tapered sleeve around the inner pipe 34 and coating 52. Then the tapered inner surface of the centralizer 50B is forced longitudinally over the tapered outer surface of the sleeve 78, providing an interference fit which secures the sleeve to the pipe 34. Finally, centralizer body 50B is secured to the tapered sleeve 78 by adhesive bonding or by welding of the plastic parts. Precautions to prevent arcing due to contaminants are fewer and less critical with this embodiment, since the centralizer does not have any radial slits as with the other embodiments.

Although, the inner pipe 34 is substantially aligned coaxially with the outer pipe 32 with centralizers 50, it is desired to provide a flow path in the form of gaps or longitudinal channels between centralizers 50 and the outer pipe 32, through which the annulus can be evacuated or filled with an arc-suppressing gas as discussed above. This flow path may be created by making the outer diameter of the centralizers 50 a little smaller (by 0.2 to 0.4 inch, say) than the inner diameter of the outer pipe 32, or by forming longitudinal grooves or scallops (not shown) into the outer surfaces of the centralizers 50.

The centralizers are placed at longitudinal intervals which will prevent the inner pipe from buckling due to installation or operational loads. In practice, this interval between centralizers may be about 10 to 20 feet. The inner pipe is thus prevented from moving into such proximity with the outer pipe that an arc or direct contact might result.

Figure 5:
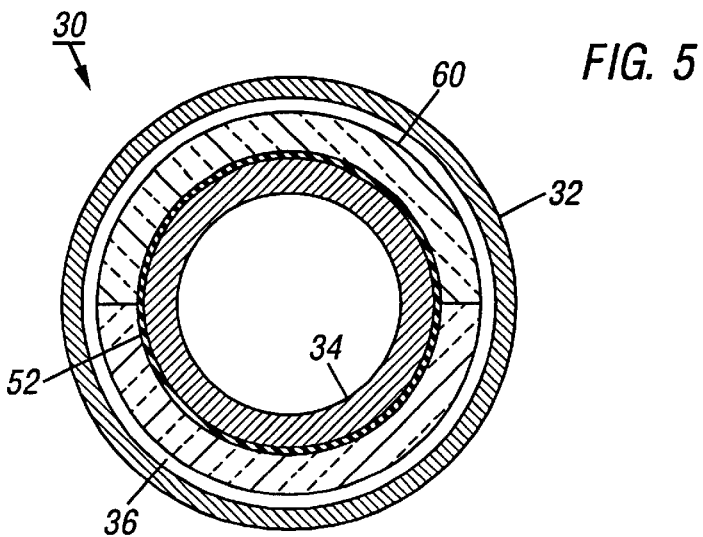
FIG. 5 is an axial cross sectional view of a thermal insulator of the embodiment of the present invention of FIG. 2, taken at line 5—5 in FIG. 2.

FIG. 5 illustrates a cross section through pipe-in-pipe flowline 30 at a ring of insulated panels 60. Describing the components from the inside out, the product flowline or inner pipe 34 is provided a smooth, continuous inner surface that does not promote fouling and is piggable as may be necessary to clear the line or for other purposes. The outside of inner pipe 34 is provided a thick coating 52 of an arc-resistant material such as high density polyethylene or polypropylene which may be extruded over an initial corrosion resistant coating. A pair of low density plastic foam insulation panels of a material such as polyisocyanurate are assembled about inner pipe 34 for insulative coverage between centralizers 50 (see FIG. 2). These may be conveniently handled in 4- to 6-foot long sections or so. These panels are glued or taped in place with electrically insulative, arc-resistant materials about the inner pipe and a seal secured with the abutting centralizers 50. This low density foam is partially open celled so that evacuation of the annulus, then filling it with Sulphur Hexafloride ($SF_6$) injection operations will tend to fill the voids with arc-suppressing, thermally insulative gas. Further, the surface of panels 60 may be coated for increased char-resistance. In particular, anti-char coatings such as a silicon rubber based compound marketed by Dow under the name Sylgard may be used immediately adjacent centralizers 50. The characteristics of the low density plastic foam may be selected for inhibiting its tendency to crumble and create debris within annulus 36. If desired, an aluminized mylar film can be affixed to the outside of the panels, shiny side out, to reduce radiant heat loss.

Further, the seams formed by adjoining pieces of foam insulation could allow possible contaminants such as pipe scale and/or water to form a path to the inner pipe and result in electrical failure across the annulus. The foam insulation may be conveniently wrapped with an adhesive backed membrane to ensure against this risk. A suitable membrane is permeable to air and water vapor, allowing their removal from the foam under vacuum, but blocking entry of liquid water and solids such as pipe scale. Tyvek®, a material marketed by DuPont, would be useful for such embodiments.

The interior of outer pipe 32 is preferably treated to prevent the formation of scale which might bridge the annulus or initiate an arc. Such treatment might include a pickling operation with acid and oil treatments, or blast cleaning followed by internal coating with epoxy or nylon or installation of a liner. If a liner is installed, it could include a mylar film to further limit radiant heat loss.

Finally, the outside of outer pipe 32 will typically be provided with a corrosion resistant coating and cathodic protection as commonly deployed in offshore applications, e.g., a fusion bonded epoxy coating, together with sacrificial anodes spaced at intervals along the pipeline. Further, if DC power transmission is used, the polarity should be such as to further cathodically protect the outer pipe.

Figure 6:
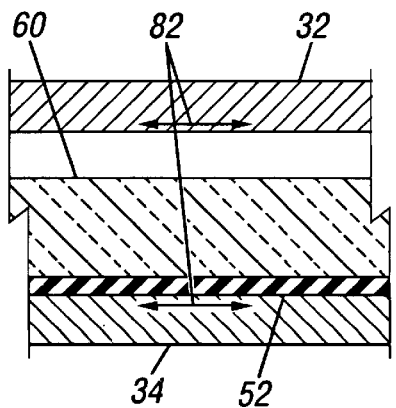
FIG. 6 is a longitudinal cross sectional view of the pipeline walls and the annulus in accordance with an embodiment of the present invention.

It should be noted that AC power has several benefits over DC power, and is preferred for this application. First, the power and voltage requirements for direct electrical heating of the pipeline and power transmission to the satellite wells is within conventional AC power engineering limits and is already available on platforms in standard 60 Hertz power plant configurations. Although it may be desirable to alter the frequency in certain applications, the basic power commitments for pipe lengths up to 40 miles, and perhaps more, may be achievable without special purpose generators. Second, DC power raises significant concerns about corrosion control for the underwater pipelines, which is not an issue for AC power. Finally, in a pipe-in-pipe flowline, the skin effect and proximity effect associated with AC power cause the current to travel on the outside of inner pipe 34 and the inside of outer pipe 32. See arrows 82 in FIG. 6. Safety is enhanced as almost no voltage potential is present on the outside of carrier pipe 32.

FIGS. 7A–7D illustrate one method for installation of a pipe-in-pipe flowline suitable for direct electric pipeline heating and other power transmission to remote subsea wells. In FIG. 7A, Carrier pipe 32A is suspended on end in slips 90 at weld floor 92 of a J-lay installation barge. Collar/elevator 96A engages shoulder 94 presented on the end of pipe sections of carrier pipe 32A to secure this suspension. An end of a section of product flowline 34A extends out of carrier pipe section 32A. These pipes are joined together at the terminal end as shown in FIG. 2. Since the centralizers 50 provide substantial lateral support and prevent buckling between outer pipe 32A and inner pipe 34A, these centralizers thereby also prevent relative longitudinal movement (sliding) between the two pipes, even when suspended vertically as shown in FIGS. 7A–7D.

Another concentrical arrangement of inner and outer pipe sections 34B and 32B, respectively, is lowered into place for joining into the pipeline while supported by the collar/elevator 96B. The internal plug 98 on the upper end of the vertically approaching inner pipe section 34B allows the inner pipe to extend beneath outer pipe 32B, but not to slide farther down.

In FIG. 7B, inner pipes 34A and 34B are brought into position and welded together. Special care is taken to prevent the deposition of debris into the annulus as installation proceeds. The inner pipe weld is coated, e.g., by a shrink sleeve of polyethylene or polypropylene, which provides continuity to both corrosion coating and arc-resistant barrier coating 52 on the outside of inner pipe 34.

High temperature thermal insulation material such as mineral wool 53 is placed in the annulus between the two welds as a protection to other heat sensitive materials in the annulus. Otherwise, heat might damage membranes, coatings, and/or insulative foam under the weld, creating a charred material and possible electrical path to the inner pipe. It is convenient to fabricate and install this char-resistant refractory material as "clamshell" halves similar to the foam insulation. It is only necessary that this protection extend for a few inches to each side of the weld.

Then outer pipe 32B is lowered into alignment with outer pipe 32A and welded into place. See FIG. 7C. An appropriate corrosion coating is applied to the outer pipe weld, collar/elevator 96A is removed, the assembled pipe-in-pipe section is lowered through the slip until pipeline is suspended by collar/elevator 96B, and internal plug 98 is removed. See FIG. 7D. This J-Lay process then repeats with adding successive sections to the pipe-in-pipe flowline 30.

Alternatively, these vertical pipe assembly techniques may be utilized horizontally to install pipe-in-pipe flowlines by the S-Lay method. As another possible alternative, long sections, e.g., 1500 feet or so, of inner pipe 34 and outer pipe 32 may be assembled onshore, strung together into concentric relation, and sequentially reeled onto a large diameter reel for later instllation offshore.

The pipe-in-pipe configuration of subsea pipeline 10 is also useful for leak detection. In embodiments maintaining a vacuum in the annulus, a leak in the outer pipe will manifest as water vapor in vacuum pump discharge 56A. See FIG. 2. Pressuring up the annulus with dry air or nitrogen will discharge bubbles 102 to locate the leak, see FIG. 1. The exact position of the leak could then be pinpointed with an ROV inspection of the exterior of the pipeline, and an external leak repair clamp can be installed at the point of failure to seal the leak. A leak in the inner pipe will be observed as hydrocarbon vapor in the vacuum pump discharge and might be located through use of an inspection pig. Repair of an inner pipe leak will require cutting the pipeline, removal of the damaged section, and re-joining of both outer and inner pipes on the seafloor with mechanical connections.

Alternately, by maintaining a constant volume charge of arc-suppressing gas such as Sulphur Hexafloride ($SF_6$) in the annulus of a pipe-in-pipe flowline, any increase in annulus pressure would signal seawater intrusion through a breach in the carrier pipe. Again, the annulus could be pressured up to leave a bubble trail to reveal the location of failure. Further, in the event of any failure of the inner pipeline, the Sulphur Hexafloride ($SF_6$) could be used a as a tracer. The annulus could be pressured up incrementally and held, and the appearance of the tracer gas at the collection point would be indicative of the pressure at which the annulus pressure exceeded the flowline pressure. This then correlates roughly to position along the pipeline. Alternatively, the travel time for a charge of high pressure gas in the annulus to enter the flowline and appear at a collection point could be correlated to approximate location along the pipeline.

At commissioning, air and water are removed from the annulus, and arc-suppressing and thermally insulative gas is injected, if desired, as discussed above. After connecting the power input to the flowline at the platform end, the level of electrical power is brought up slowly so that any arcing initiated by minor debris or contamination might occur with minimal damage. Progress in application of power to the system and resulting temperature increases at both ends of the pipeline would be monitored carefully. When brought to operational levels, it may be desired to establish calibration of actual power and voltage input to heating output by placement of thermocouples 100 at appropriate locations along the pipeline.

In operation, the modified pipe-in-pipe flowline provides convenient power transmission for direct electric heating of the pipeline and for driving remote electrical components. The heating is useful for preventing hydrate formation and paraffin deposition, and for enhancing flow of heavy crudes. This is particularly important while maintaining well fluids within a shut-in subsea pipeline. It is also useful for reversing blockages caused by hydrate formation and paraffin disposition at somewhat higher, but nonetheless practical power levels. Further, it should be noted that pulses and frequency modulation can be carried as control signals along with the power transmission to control components at remote satellite subsea wells or the like.

Other modifications, changes and substitutions are intended in the foregoing disclosure and in some instances some features of the invention will be employed without a corresponding use of other features. Accordingly, it is appropriate that the appended claims be construed broadly and in the manner consistent with the spirit and scope of the invention herein.

What is claimed is:

1. A system for direct electric heating of a pipeline, comprising:
   a pipe-in-pipe flowline, comprising:
   an electrically conductive protective outer pipe;
   an electrically conductive inner pipe arranged longitudinally, substantially concentrically within the outer pipe;
   an annulus defined between the inner and outer pipes;

a pipe insulating joint assembly which structurally joins but electrically insulates the inner and outer pipes at a first end of the pipeline; and an electrical pathway electrically connecting the inner and outer pipes at a second end of the pipeline; and a power input electrically connected across the inner and outer pipes at the first end of the pipeline.

2. A system for direct electric heating of a pipeline in accordance with claim 1, further comprising a plurality of thermally and electrically insulative centralizers spaced at intervals along the annulus to prevent electrical contact as well as to reduce conductive heat transfer between the inner and outer pipes.

3. A system for direct electric heating of a pipeline in accordance with claim 2, wherein the centralizers comprise char-resistant plastic collars assembled wholly from non-electrically conductive components.

4. A system for direct electric heating of a pipeline in accordance with claim 2, further comprising an arc-resistant coating on the outside of the inner pipe.

5. A system for direct electric heating of a pipeline in accordance with claim 2, further comprising a plurality of low density, plastic foam insulators placed in the annulus around the inner pipe between the centralizers.

6. A system for direct electric heating of a pipeline in accordance with claim 3, wherein the centralizers define passages such that the annulus is substantially open for longitudinal flow along its length.

7. A system for direct electric heating of a pipeline in accordance with claim 6, further comprising a vacuum pump communicating with the annulus for evacuating the annulus to remove air and water vapor.

8. A system for direct electric heating of a pipeline in accordance with claim 6, further comprising an arc-suppressing gas filling the annulus.

9. A system for direct electric heating of a pipeline in accordance with claim 1, wherein the electrical pathway electrically connecting the inner and outer pipes at the second end of the pipeline comprises a metal bulkhead assembly.

10. A system for direct electric heating of a pipeline in accordance with claim 1, wherein the power input electrically connected across the inner and outer pipes at the first end of the pipeline further comprises:

an electrical penetrator in electrical communication with the inner pipe but electrically insulated from the outer pipe, through the pipe insulating joint assembly;

a first terminal electrically connected to the outer pipe at the first end of the pipeline; and a second terminal electrically connected to the inner pipe through the electrical penetrator.

11. A system for direct electric heating of a pipeline in accordance with claim 10, wherein the power input electrically connected across the inner and outer pipes at the first end of the pipeline further comprises:

an AC generator; and an electrical transformer having a primary coil connected to the AC generator and a secondary coil connected to the first and second terminals at the first end of the pipeline.

12. A system for direct electric heating of a pipeline in accordance with claim 10, wherein the power input electrically connected across the inner and outer pipes at the first end of the pipeline further comprises a DC generator connected across the first and second terminals at the first end of the pipeline.

13. A system for direct electric heating of a pipeline, comprising:

a pipe-in-pipe flowline, comprising:

an electrically conductive protective outer pipe;

an electrically conductive inner pipe arranged longitudinally, substantially concentrically within the outer pipe;

a thick, arc-resistant plastic coating on the outside of the inner pipe;

an annulus defined between the inner and outer pipes;

a plurality of thermally and electrically insulative centralizers spaced at intervals along the annulus to prevent electrical contact as well as to reduce conductive heat transfer between the inner and outer pipes;

a plurality of low density, plastic foam insulators placed in the annulus around the inner pipe between the centralizers;

a pipe insulating joint assembly which structurally joins but electrically insulates the inner and outer pipes at a first end of the pipeline; and an electrical pathway electrically connecting the inner and outer pipes at a second end of the pipeline;

a power input electrically connected across the inner and outer pipes at the first end of the pipeline, comprising:

an AC generator;

an electrical penetrator in electrical communication with the inner pipe through the pipe insulating joint assembly;

a first terminal electrically connected to the outer pipe at the first end of the pipeline;

a second terminal electrically connected to the inner pipe through the electrical penetrator; and an electrical transformer having a primary coil connected to the AC generator and a secondary coil the first and second terminals at the first end of the pipeline.

14. A system for direct electric heating of a pipeline in accordance with claim 13, wherein the centralizers define passages such that the annulus is substantially open for longitudinal flow along its length.

15. A system for direct electric heating of a pipeline in accordance with claim 14, further comprising a vacuum pump communicating with the annulus for evacuating the annulus to remove air and water vapor.

16. A system for direct electric heating of a pipeline in accordance with claim 14, further comprising an arc-suppressing gas filling the annulus.

17. A system for direct electric heating of a pipeline in accordance with claim 13, further comprising a reservoir of dry air for driving water vapor from the annulus.

18. A system for direct heating of a pipeline in accordance with claim 13, further comprising a reservoir of dry nitrogen for driving water vapor from the annulus.

19. A system for direct electric heating of a pipeline in accordance with claim 13, wherein the electrical pathway electrically connecting the inner and outer pipes at a second end of the pipeline is a pipe insulating joint assembly, configured with a second set of electrical terminals and a second electrical penetrator.

* * * * *